Jan. 12, 1960 H. F. MARTIN 2,921,144

TRANSDUCER SUPPORT FOR SOUND RECORDING OR REPRODUCING SYSTEM

Filed Feb. 6, 1956

INVENTOR.
HAROLD F. MARTIN
BY
Campbell, Brumbaugh, Free & Graves
HIS ATTORNEYS

United States Patent Office 2,921,144

Patented Jan. 12, 1960

2,921,144

TRANSDUCER SUPPORT FOR SOUND RECORDING OR REPRODUCING SYSTEM

Harold F. Martin, Los Gatos, Calif., assignor to International Business Machines Corporation, New York, N.Y., a corporation of New York Application February 6, 1956, Serial No. 563,540

8 Claims. (Cl. 179—100.2)

The present invention relates to improvements in magnetic heads or transducers for sound recording or reproducing systems, and more particularly to a floating support or carrier for a magnetic head or transducer of that general organization wherein the passage of an air or other fluid stream across the upper surface of the transducer support serves to translate the transducer support into operative relationship with respect to a surface of a magnetic record, while at the same time insuring a small gap between the transducer support and the record to prevent frictional contact therebetween.

Various proposals have been heretofore suggested for utilizing a stream of air to maintain a separation between a record member and a magnetic head or transducer cooperating therewith. In certain of these prior proposals, the flow of air between the record member and the magnetic head, besides preventing frictional contact therebetween, creates a low pressure gap which tends to urge the record member toward the head. Obviously, such an arrangement may be feasible when a lightweight, flexible magnetic tape is employed as the record member, but it would be impractical for use in combination with a relatively rigid disk type record member because the low pressure gap would have virtually no effect thereon.

In addition, considerable difficulty has been encountered in these prior proposals in maintaining a relatively constant gap between the magnetic head and the record member.

The transducer support of the present invention comprises an annular floating body disposed adjacent the surface of the record with which it is intended to cooperate. The upper surface of the floating body adjacent the record extends outwardly from the center thereof, and the upper surface at the outer periphery of the body slopes progressively toward the base of the body or, in other words, in a direction away from the plane of the record member. At the center of the floating body, means is provided to discharge a fluid stream radially across the surface of the body.

This fluid stream, following the surface of the body, is deflected away from the plane of the record at the outer periphery thereof, thereby imparting to the body, by means of the well-known Coanda effect, a thrust which tends to urge the body in the direction of the record member. This thrust may be supplemented by the translating effect imparted to the body due to the reduction in pressure resulting from the rapid flow of the fluid across the surface. Thus, if the body is of sufficiently lightweight construction, it will be translated into close proximity with the record member, even though the body be disposed beneath the record.

Frictional contact between the body and the record member may, however, be prevented by the radial flow of the fluid across the surface of the floating body, which flow produces a force which tends to separate the body and the record member when the body comes into close proximity with the record member. This radial flow of fluid across the surface of the body, therefore, both translates the body toward the surface of the record member and prevents frictional contact therebetween.

Ultimately, of course, the floating body will reach a position of equilibrium with respect to the surface of the record when the force tending to translate the body toward the record member is counterbalanced by the force tending to separate the body and the record member. It is understood, therefore, that if this position of equilibrium is maintained by a constant flow of fluid across the surface of the body, a relatively constant gap will be provided between the magnetic head and the record member.

For a complete understanding of the present invention, reference may be made to the detailed description which follows and to the accompanying drawings wherein.

Figure 1:
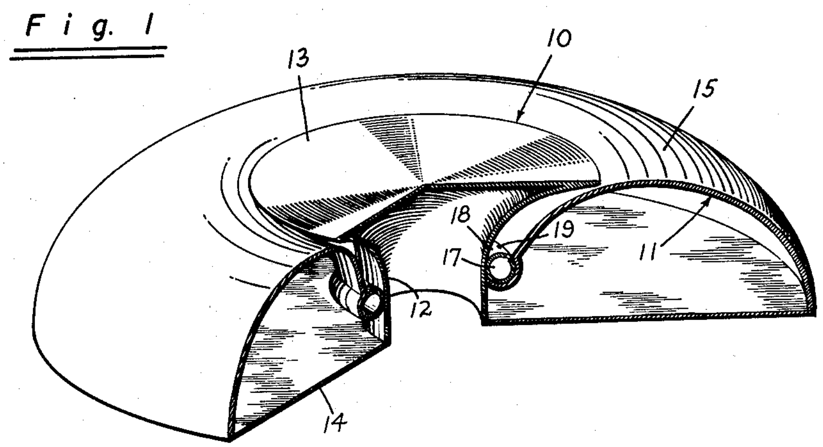
Figure 1 is a perspective view of the supporting for the magnetic head or transducer of the present invention having a sector thereof removed.

Referring to Figure 1 of the drawings, the floating support for the magnetic head or transducer of the present invention comprises generally a centrally disposed hollow stem 10 and a hollow toroidal body 11 surrounding the stem, the stem extending upwardly from the recessed center portion of the body.

The hollow stem 10 includes a circular baffle wall 12 which curves outwardly at the upper end thereof, and a flat head 13 which covers the hollow center of the stem.

The toroidal body 11 is formed by the lower portion of the circular wall 12, by a base plate 14 which is connected to and surrounds the lower end of the circular wall 12, and by a convexly curved upper wall 15 which extends from the outer edge of the base plate 14 to the outer surface of the circular wall 12. The toroidal body serves as a support for either a recording or pickup transducer 16 which, as shown in Figure 3, may be accommodated within the hollow interior of the stem portion 10.

A toroidal passage 17 is formed at the inner edge of the upper wall 15 adjacent the outer surface of the circular wall 12, and a circular conduit 18 is accommodated within said toroidal passage. The circular conduit 18 communicates with a supply of air or other gaseous fluid under pressure, and the air is discharged from the conduit through ports 19 into a passage formed between the outer surface of the wall 12 and the upper surface of the wall 15. If desired, the air supply can communicate with the conduit 18 from the hollow center of the valve stem through one or more ports (not shown) passing through the wall 12 of the valve stem and the wall of the conduit 18.

Figure 3:
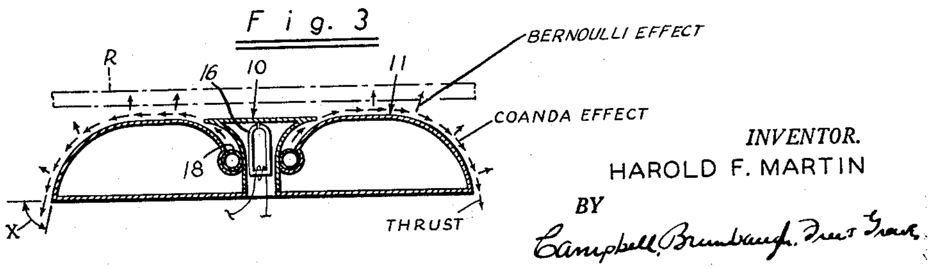
Figure 3 is a cross-section elevation view of the magnetic head support shown in Figure 1, illustrating the flow of the fluid across the upper surface thereof and the lifting effect produced thereby.

As best shown in Figure 3, the passage formed between the outer surface of the circular baffle wall 12 and the upper surface of the body 11 permits air to flow radially outwardly, and the outward curvature of the upper end of the baffle wall 12 forms a restricted discharge opening from this passage. This restricted discharge opening provides a nozzle effect which produces a rapid flow of air across the upper surface of the body 11. The radial stream of air discharged through this restricted passage preferably approximates directions substantially perpendicular to the axis of the body 11.

The magnetic head support of the present invention, as mentioned above, is adapted to be disposed beneath the record member R with which it is in operative relationship, and the radial flow of air at high velocity across the convexly curved surface of the body 11 produces a lifting effect which causes the head support to float toward the overlying record member R. The upward movement imparted to the magnetic head support is due in part to the Bernoulli effect, that is to say, the reduction in pressure above the body 11 produced by the rapid flow of air across the upper surface thereof, but primarily to a Coanda effect at the fringe areas of the body 11 which imparts an upward thrust to the magnetic head support by virtue of the flow of air in contact with the portion of the surface which curves away from the plane of the record member R. In other words, as the radial stream or jet of air flows outwardly along the upper surface of the body 11, it is deflected downwardly along the surface forming the outer periphery of the magnetic head support, ultimately leaving the surface at an angle $x$ with the horizontal and imparting an opposite thrust to the magnetic head support. The angle $x$ is preferably an angle which exceeds 45° and may approach 90° so that the thrust yet will afford a maximum component upwardly to lift the magnetic head support.

This combined lifting effect will urge the magnetic head support upwardly toward the record member R, and if the magnetic head support is of sufficiently lightweight construction, the magnetic head support will actually rise toward the record member until it reaches a position of equilibrium beneath the surface of the record member. At the position of equilibrium, the forces tending to lift the magnetic head support will be counterbalanced by the radial flow of air between the record member R and the body 11 which tends to prevent frictional contact therebetween. If, therefore, a constant flow of fluid is maintained across the upper surface of the body 11, the magnetic head support may be designed so that it will be raised to the desired operative relationship with the record member R, while, nevertheless, affording the desired gap between the magnetic head support and the record member.

Figure 2:
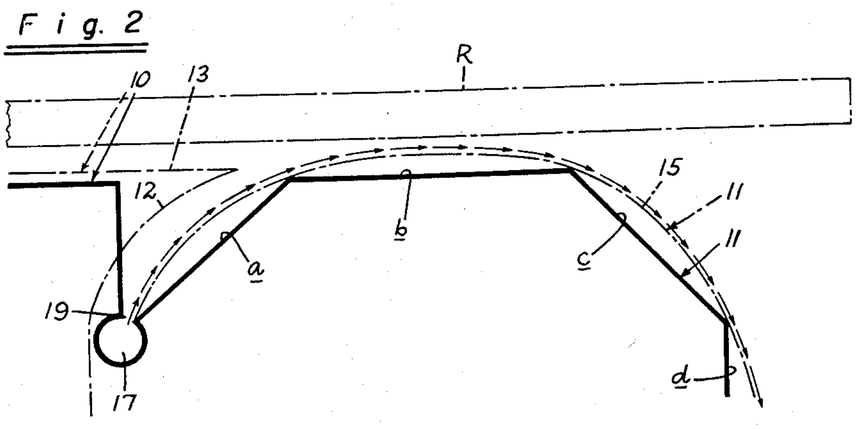
Figure 2 is a greatly enlarged view showing an alternative embodiment of the invention in solid lines and the corresponding parts of the embodiment of Figure 1 in phantom lines.

An alternative embodiment of the present invention is shown in solid lines in Figure 2 superimposed over the corresponding parts shown in phantom lines in the preferred embodiment of Figure 1. In Figure 2 the upper surface of the body 11, instead of comprising the convexly curved surface shown in Figure 1, comprises a plurality of planar surfaces, for example, the upwardly inclined surface $a$, the substantially horizontally disposed surface $b$, the downwardly sloping surface $c$, and the substantially vertical surface $d$. The stream of air discharged from the toroidal passage 17 of the magnetic head support will generally follow a path across the planar surfaces $a$, $b$, $c$ and $d$, imparting a lifting effect to the magnetic head.

The invention has been shown in preferred forms only and by way of example, and obviously many variations and modifications may be made therein without departing from the spirit of the invention. The invention, therefore, is not to be limited to any specified form or embodiment except in so far as such limitations are set forth in the claims.

I claim:

1. A transducer support comprising a floatable body which in operative position is separated from a surface of a record by a fluid film and thrust toward the surface by the Coanda effect produced by a flow of the fluid at the outer periphery thereof, said body having a surface which is adjacent the surface of the record when the floatable body is in operative position with respect to the record surface, said surface extending outwardly from the center and sloping away from the record surface at a relatively steep angle at the outer periphery of the floatable body, and means at the center of the floatable body adjacent the surface of the record for producing a radial flow of the fluid in all directions across the surface of the floatable body, whereby the outward flow of fluid between the record surface and the adjacent surface of the floatable body reduces the pressure in the gap between the floatable body and the record surface and forms the fluid film which prevents the floatable body from moving into frictional contact with the record surface, and the flow of fluid away from the record surface at the outer periphery of the floatable body imparts a thrust to the floatable body due to the Coanda effect which urges the floatable body toward the record surface.

2. A transducer support comprising a floatable body which in operative position is separated from a surface of a record by a fluid film and thrust toward the surface by the Coanda effect produced by a flow of the fluid at the outer periphery thereof, said body having a surface which is adjacent the surface of the record when the floatable body is in operative position with respect to the record surface, said surface extending outwardly from the center and sloping away from the record surface at a relatively steep angle at the outer periphery of the floatable body, a surface defining a recessed portion of the floatable body at the center thereof, means within the recess in communication with a source of fluid under pressure for discharging the fluid, and means within the recess for deflecting the discharged fluid outwardly in all directions across the surface of the floatable body adjacent the record surface, whereby the outward flow of fluid between the record surface and the adjacent surface of the floatable body reduces the pressure in the gap between the floatable body and the record surface and forms the fluid film which prevents the floatable body from moving into frictional contact with the record surface, and the flow of fluid away from the record surface at the outer periphery of the floatable body imparts a thrust to the floatable body due to the Coanda effect which urges the floatable body toward the record surface.

3. A transducer support comprising a floatable body which in operative position is separated from a surface of a record by a fluid film and thrust toward the surface by the Coanda effect produced by a flow of the fluid at the outer periphery thereof, said body having a surface which is adjacent the surface of the record when the floatable body is in operative position with respect to the record surface, said surface extending outwardly from the center and sloping away from the record surface at a relatively steep angle at the outer periphery of the floatable body, the outer periphery of the floatable body defining a circle, a surface defining a recessed portion at the center of the floatable body, means within said recessed portion for discharging a fluid under pressure, and an upwardly and outwardly extending fluid deflecting wall of circular cross-section which is spaced apart from the surface defining the recessed portion of the floatable body, said deflecting wall directing the fluid radially outwardly in all directions across the surface of the floating body adjacent the record surface, whereby the outward flow of fluid between the record surface and the adjacent surface of the floatable body reduces the pressure in the gap between the floatable body and the record surface and forms the fluid film which prevents the floatable body from moving into frictional contact with the record surface, and the flow of fluid away from the record surface at the outer periphery of the floatable body imparts a thrust to the floatable body due to the Coanda effect which urges the floatable body toward the record surface.

4. A transducer support as set forth in claim 3 wherein said means within the recessed portion for discharging the fluid is an annular passage having a plurality of discharge openings which communicate with the space between the surface defining the recessed portion and the deflecting wall.

5. In a recording or reproducing system, a transducer support adapted to cooperate with a magnetic record member, said transducer support comprising a floatable toroidal body having a convexly curved surface, a circular baffle wall disposed at the center of the body, the end of the baffle wall in proximity to the record member extending outwardly of the end remote from the record member, said baffle wall and the surface of the toroidal body defining a passage therebetween, and means disposed within said passage for discharging a fluid under pressure into said passage, the fluid stream being directed across the surface of the body toward the outer periphery of the body in all directions, the stream of air at the outer periphery of the body imparting a thrust to the body whereby the body is moved toward the record member, and the flow of fluid across the surface of the body maintaining a gap between the record member and the surface of the floatable body to prevent frictional contact therebetween.

6. A transducer support as set forth in claim 5 wherein the circular baffle wall and the surface of the toroidal body form a restricted discharge opening for said passage, said restricted opening directing the fluid stream outwardly across the surface of the toroidal body in directions substantially perpendicular to the center axis of the body.

7. A transducer support adapted for use in cooperation with a magnetic record member comprising a floatable body which in operative position has a surface adjacent the surface of the record, said surface of the floatable body sloping away from the plane of the record member at the outlying areas of said surface, the surface at the extreme outer periphery of said floatable body forming an angle which approaches a right angle with the plane of the record, and means disposed substantially centrally of said floatable body for discharging a stream of fluid outwardly across said surface in all directions, thereby imparting a thrust to the floatable body to move it toward the plane of the record, the passage of the fluid across the said surface, however, preventing frictional contact between the floatable body and the record member.

8. A transducer support adapted for use in cooperation with a magnetic record member comprising a floatable toroidal body, a circular baffle wall at the center of the floatable toroidal body, the end of the baffle wall in proximity to the record member curving outwardly away from the axis of the floatable toroidal body, said toroidal body surrounding said baffle wall, the surface of the toroidal body in proximity to the record member being convexly curved, a passage defined between the baffle wall and a portion of the surface of the toroidal body at the inner periphery thereof, said passage communicating with a supply of a fluid under pressure, and a restricted discharge opening defined between the surface of the toroidal body and the outer edge of the baffle wall for discharging a radial fluid stream across the surface of the toroidal body for building up pressure in the passage to insure a continuous, uniform radial flow of fluid in all directions.

References Cited in the file of this patent

UNITED STATES PATENTS

| | | |
|---|---|---|
| 1,990,548 | Keller et al. | Feb. 12, 1935 |
| 2,038,216 | Harrison et al. | Apr. 21, 1936 |
| 2,612,566 | Anderson et al. | Sept. 30, 1952 |

FOREIGN PATENTS

| | | |
|---|---|---|
| 877,210 | Germany | May 21, 1953 |